United States

[11] 3,619,023

| [72] | Inventor | Robert E. Brooks<br>Redondo Beach, Calif. |
|---|---|---|
| [21] | Appl. No. | 804,207 |
| [22] | Filed | Mar. 4, 1969 |
| [45] | Patented | Nov. 9, 1971 |
| [73] | Assignee | TRW Inc.<br>Redondo Beach, Calif. |

[54] OPTICAL ELEMENT FOR GENERATING CONTOUR STRIPES
8 Claims, 6 Drawing Figs.

| [52] | U.S. Cl. | 350/3.5,<br>356/109 |
|---|---|---|
| [51] | Int. Cl. | G02b 27/22 |
| [50] | Field of Search | 350/3.5;<br>356/109 |

[56] References Cited
OTHER REFERENCES

Stroke et al., " Two-Beam Interferometry By Successive Recording of Intensities in a Single Hologram," Applied Physics Letters (11/1965)

Erdos, IBM Tech. Disclosure Bulletin, Vol. 9 No. 3, p. 291 (8/1966).
Brooks, Electronics, Vol. 40, No. 10, pp. 88– 93 (5/1967)
Stetson et al., " Hologram Interferometry" pp. 1– 18 (12/1965)
Schwar et al., 15 Nature 239 (7/1967) pages 239– 241

*Primary Examiner*— David Schonberg
*Assistant Examiner*— Robert L. Sherman
*Attorneys*— Daniel T. Anderson, Gerald Singer and Alfons Valukonis ABSTRACT: An optical element for generating in space a fringe pattern consisting of light maxima and minima. This optical element consists of a hologram on which light from two adjacent light sources generating light of substantially the same frequency has been recorded. The fringe pattern may be utilized for moire gauging or for the production of contour maps. One hologram may have a single fringe pattern or a plurality of fringe patterns recorded thereon. Also, a simplified holographic apparatus is disclosed for producing the optical element.

PATENTED NOV 9 1971

Robert E. Brooks
INVENTOR.

BY *Edis a. Osm.*

ATTORNEY

Robert E. Brooks
INVENTOR

BY *Edi A. Osu.*

ATTORNEY

OPTICAL ELEMENT FOR GENERATING CONTOUR STRIPES

CROSS-REFERENCE TO RELATED APPLICATIONS

The optical element of the present invention may be used in connection with the "Moire Gauging Systems" disclosed in the copending application to Brooks and Heflinger, Ser. No. 760,572 filed on Sept. 18, 1968 (D–4,383) and assigned to the assignee of the present invention.

BACKGROUND OF THE INVENTION

The invention relates generally to holography, and particularly relates to a hologram serving as an optical element for generating in space a fringe pattern consisting of light maxima and minima when illuminated by substantially monochromatic light.

In the copending application to Brooks and Heflinger above referred to, there is disclosed a moire gauging system permitting to compare an object to itself or to a replica. For this moire gauging system and for other purposes such as the production of contour maps it is necessary to generate light fringe patterns. These fringe patterns consist of light maxima and minima each member of a family of light maxima being contained substantially in a surface.

It has been proposed in the copending application to generate these light sheets by an optical interferometer. This is a critical and expensive item of the moire gauging system. For example, the optical interferometer must be drift-free and must be isolated from air currents which may cause the fringe patterns to move. Furthermore, the optical interferometer must be so mounted as to be substantially free of vibration. In other words, any vibration having an amplitude larger than a fraction of the wave length of light may cause the fringe pattern to move and may thus spoil the measurement. This, of course, reduces the accuracy of the moire gauging system. Additionally, it may be difficult or awkward to set up an optical interferometer in a machine shop where mechanical parts may have to be measured such, for example, as turbine blades.

It is accordingly an object of the present invention to provide a simple and inexpensive optical element for generating the light maxima and minima referred to hereinabove.

Another object of the invention is to provide a single hologram on which a plurality of fringe patterns have previously been recorded, each of which may be reproduced at will by illuminating the hologram with substantially monochromatic light.

A further object of the invention is to provide simplified holographic apparatus for producing the optical element previously discussed, whereby the interference sheets are stable and drift-free and can be made with extremely accurate spacing.

SUMMARY OF THE INVENTION

An optical element in accordance with the present invention serves the purpose of generating in space a particular light fringe pattern when illuminated by a reproducing reference beam of substantially monochromatic light. As pointed out before, the fringe pattern consists of light maxima and minima, each member of a family of light maxima being contained substantially in a surface. This surface may either be plane or curved. The optical element itself consists of a suitable recording material, such for example, as a photographic material for recording thereon a hologram. The hologram corresponds to the interference pattern developed when a recording reference beam and two adjacent light sources, each developing the same monochromatic light beam, are caused to shine on the recording material.

It is also feasible to record more than one fringe pattern on a particular recording material. Furthermore, simplified apparatus has been disclosed for recording the fringe pattern on a hologram and for reproducing it therefrom.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
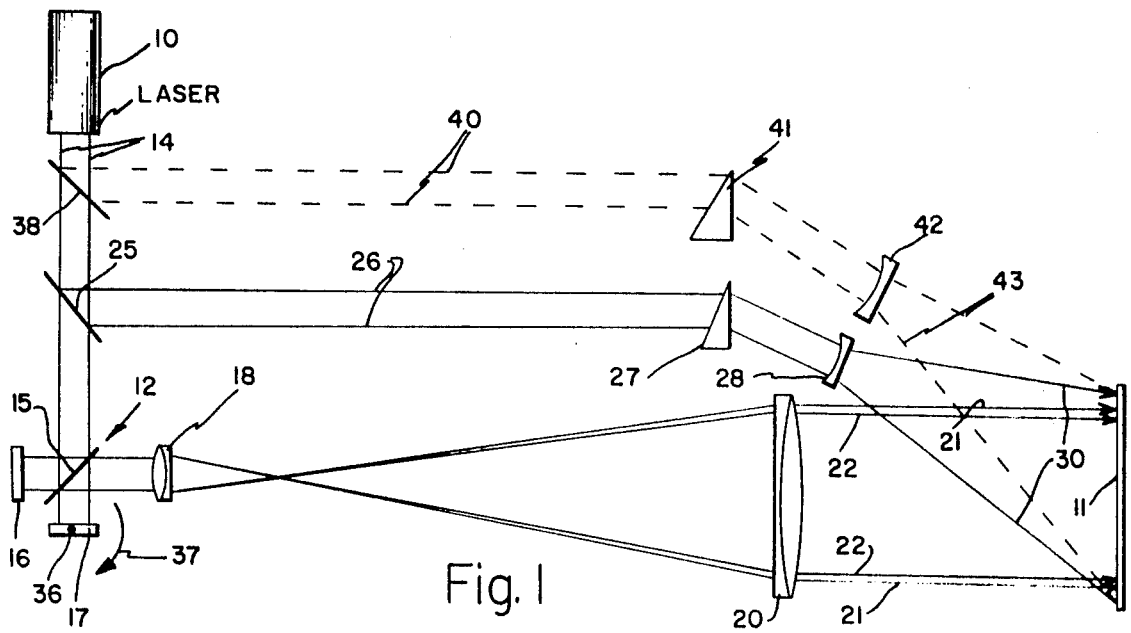
FIG. 1 is a schematic representation of an interferometric arrangement for recording a fringe pattern on a suitable recording material and illustrating an additional recording reference beam for optionally recording an additional fringe pattern.

Referring now to the drawings, wherein like elements have been designated by the same reference characters, and particularly to FIG. 1, there is illustrated an interferometric arrangement for generating and recording a hologram of a fringe pattern. This fringe pattern consists of two beams from two virtual light sources which are made to interfere with each other. When the light from the two beams falls on a surface it will there create a fringe pattern consisting of a light maxima and minima. The light maxima may be said to constitute a family, each member of the family being confined to a particular surface which may be either plane or curved. To this end, there may be provided a laser 10 illustrated schematically. It should be understood, however, that any monochromatic light source may be used instead; such, for example, as a mercury arc containing a single mercury isotope. The laser 10 is used for illuminating a suitable recording material 11. This may be any photosensitive material, such for example, as a photochromic material, or a photographic film or plate. The recording plate 11 is illuminated for example, by a Twyman-Green interferometer generally indicated at 12. However, it should be understood that many other interferometric arrangements may be used for projecting on the recording material 11 monochromatic light from two adjacent, virtual light sources.

The laser 10 develops an essentially parallel light beam 14 of monochromatic light which is focused or projected on a semisilvered mirror 15. The light reflected by the mirror 15 impinges onto a mirror or reflector 16. On the other hand, the light which passes through the semisilvered mirror 15 is transmitted to another mirror or reflector 17. Each of the mirrors 16 and 17 reflects the light back onto the semisilvered mirror 15 and then onto a focusing lens 18. Eventually, the light is collimated by a second or collimating lens 20 which develops parallel light beams 21 and 22 and projects them onto the recording material 11.

In the arrangement of FIG. 1, the two mirrors 16 and 17 are not exactly at right angles to each other, but form an angle which may be either larger or smaller than 90°. As a result, two separate light beams as shown at 21 and 22, are formed as shown schematically at FIG. 1. These will provide an interference or fringe pattern on the recording material 11. In general it is desired to have two separate light beams 21, 22 having slightly different angles issue from the interferometer.

In order to record a hologram of the interference pattern recorded on the recording material 11, there may be provided a recording reference beam. To this end there is provided a beam splitter 25 interposed into the light beam 14. This may consist of a semisilvered mirror 25, which projects a parallel light beam 26 on a prism 27 and then onto a diverging lens 28 to project an enlarged light beam 30 which is the recording reference beam onto the recording material 11.

Accordingly a hologram is formed in the conventional manner. The hologram may be reconstructed as will be subsequently explained in connection with FIG. 2 by projecting thereon a reproducing reference beam 30.

A hologram prepared by a single exposure in the manner just explained will have recorded thereon an interference pattern which, when reproduced yields a fringe pattern consisting of a light maxima and minima. Actually the interference pattern may be considered as two separate interference patterns corresponding respectively to the recording beams 21 and 22. Each pattern acts generally like a diffraction grating. However, due to aberrations in the interferometer 37, laser 10 and lenses 18 and 20, it may be more complicated than a plane diffraction grating. Also if the beams which are recorded are not plane parallel, the fringes will be sections of a set of hyperboloidal surfaces. In other words, each one of a family of light maxima is contained in a surface which may be a plane or hyperboloidal surface.

Figure 2:
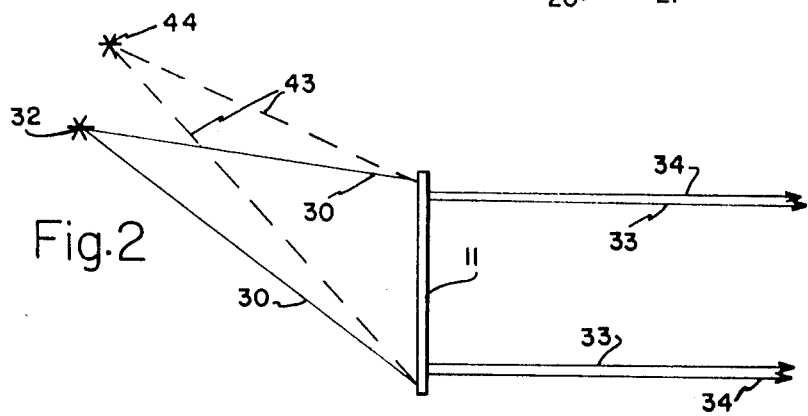
FIG. 2 is a schematic representation of an arrangement for reproducing the fringe pattern previously recorded on a recording material with one or more reproducing reference beams.

Accordingly, the hologram 11 may be reconstructed in the manner illustrated in FIG. 2. A light source may be provided at the point 32. This may be identical to the laser 10; or it may be another monochromatic light source. This will develop an expanding or diverging reproducing reference beam shown at 30, which may be identical with the recording reference beam 30 of FIG. 1. The resulting fringe pattern has been identified by the two light beams 33 and 34 issuing from the hologram 11.

In accordance with the present invention it is also possible to provide a hologram such as the plate 11 which, when reproduced yields a multiple-exposure set of fringe patterns. This means that the hologram was obtained by two or more separate exposures, each exposure providing an interference pattern on the hologram which when reproduced will yield at least one fringe pattern. This may be accomplished by making the mirror 17 rotatable about a pivot point 36 as shown in FIG. 1 and by rotating the mirror 17 in the direction of the arrow 37. Rotation of the mirror 17 will, of course, change the fringe pattern, that is, the distance between adjacent fringes, everything else being equal. However, in order to reproduce a second fringe pattern recorded on the same plate 11 it is necessary to use a separate recording reference beam. This may be accomplished by adding another beam splitter 38 and interposing it into the path of the light beam 14. This will now generate another reference beam 40, which may be deflected by a prism 41 and diverged by a lens 42 as shown. The second fringe pattern may be reproduced by a light source 44 (FIG. 2) for reconstructing the second fringe pattern by means of the reproducing reference beam 43 which may be identical with the recording reference beam 43 of FIG. 1.

Instead of recording each one of a multiple exposure hologram with a reference beam having a different direction it is feasible to record each separate fringe pattern by a reference beam having a different wavelength than another reference beam. The hologram may then be reproduced by using a reproducing reference beam identical in wavelength with that of the recording reference beam. When more than one fringe pattern is stored on the recording material 11 this is preferably made relatively thick. This will improve the discrimination between recordings and minimize crosstalk. Thus such a multiexposure hologram should be thick compared to the fringe spacing. For example, if the interferometric spacing on the hologram is on the order of 0.001 millimeter, the thickness of the hologram or plate 11 may be 0.01 millimeter.

Figure 3:
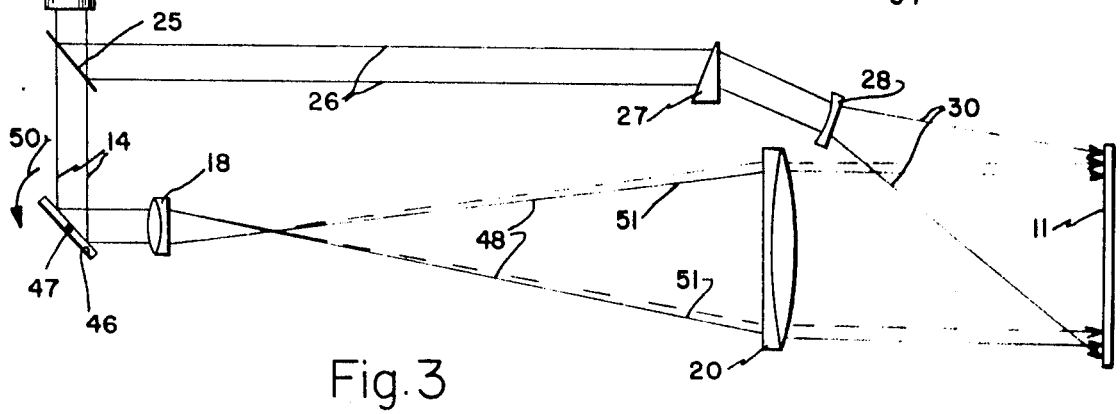
FIG. 3 is a view of an interferometric arrangement similar to that of FIG. 1, but simplified in that only a single subject beam is recorded at a time so that a double exposure is necessary for each optical element.

A simplified holographic arrangement which does not require an interferometric apparatus is illustrated in FIG. 3 to which reference is now made. Here the hologram on the recording material 11 is made by a double-exposure process. The recording reference beam 26, 30 is the same as that of FIG. 1. However, instead of the two mirrors 16, 17 there is shown a single mirror 46 which may be rotatable about a pivot 47. This projects the monochromatic light beam 14 through a first focusing lens 18 and a colimating lens 20 onto the recording material 11. Accordingly a first exposure is made by the light beam 48 shown in full lines in FIG. 3, with the mirror 46 in a particular position. Subsequently the mirror 46 may be rotated about its pivot 47, for example, in the direction of the arrow 50. Thereupon the recording plate 11 is again exposed with a second light beam 51 shown in dotted lines.

Therefore, instead of using an interferometric arrangement the hologram is made in two successive steps by rotating the mirror 46 between exposures so as to simulate the existence of two separate or virtual light sources.

The double-exposure hologram taken in the manner just explained has an additional advantage. The optical elements such as mirror 17 and lenses 18 and 20 need not be of the highest optical quality and hence, are relatively inexpensive without a commensurate decrease in the accuracy of the fringe spacing. This, of course, is a well-known advantage of any double-exposure hologram interferometer.

For the multiexposure techniques explained in connection with FIGS. 1 and 2 a relatively thick hologram may be desired. Generally however, the diffraction efficiency of a hologram on a photographic plate is relatively low and may be only a few percent. However, the efficiency may be increased to approximately 20 percent by bleaching the hologram. The bleaching process removes the silver from the photographic emulsion and hence, leaves the colorless emulsion. However, there is still a change of the refractive index of the emulsion or else a change of the thickness of the emulsion. Accordingly, a bleached hologram may still be used for diffracting light.

It is also feasible to utilize a known reflection hologram. This is made by aluminizing the surface of the hologram. It is based on the fact that the hologram has a certain surface relief which may be used for diffracting light.

Still another possibility for increasing the diffraction efficiency to as much as 90 percent is to use a so-called blazed hologram. This has been described, for example, by N. K. Sheridon in Applied Physics Letters Volume 12, 1968, page 316. Other blazed holograms have been described in the recent literature. In this process the plate is coated with photoresist material, which is subsequently etched to increase the diffraction efficiency. The etching step removes the unexposed portion of the photoresist.

In any case, a thick hologram provides a three-dimensional recording of an interference pattern and hence, diffraction takes place at the Bragg angle. This is sometimes referred to as a blazed hologram. All the techniques referred to herein relating to bleached holograms, reflection holograms and blazed holograms are generally known in the art.

Figure 4:
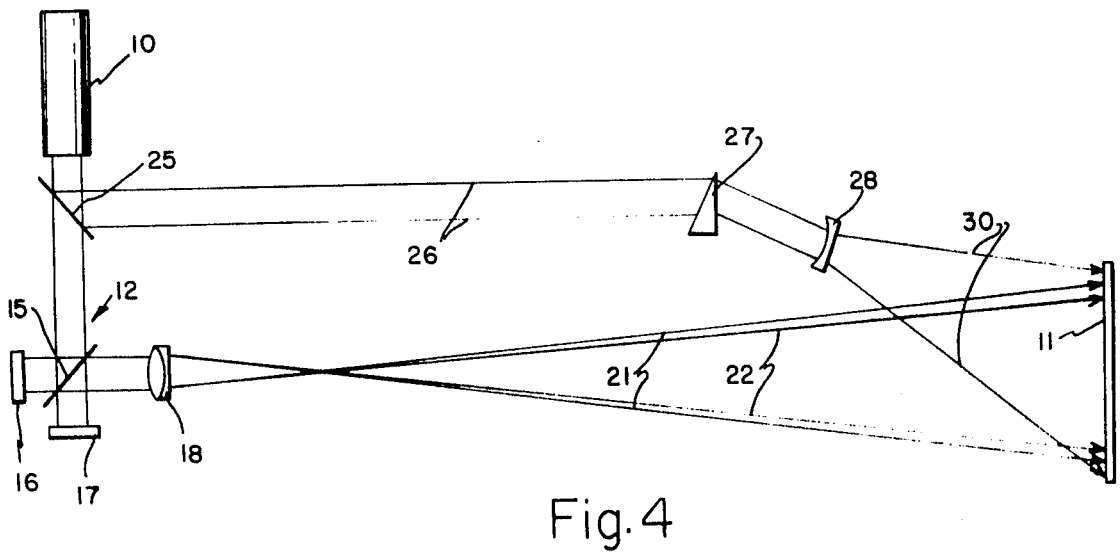
FIG. 4 is a view of a further simplified arrangement for recording a fringe pattern similar to the arrangement of FIG. 1 but utilizing a noncollimated light beam.
Figure 5:
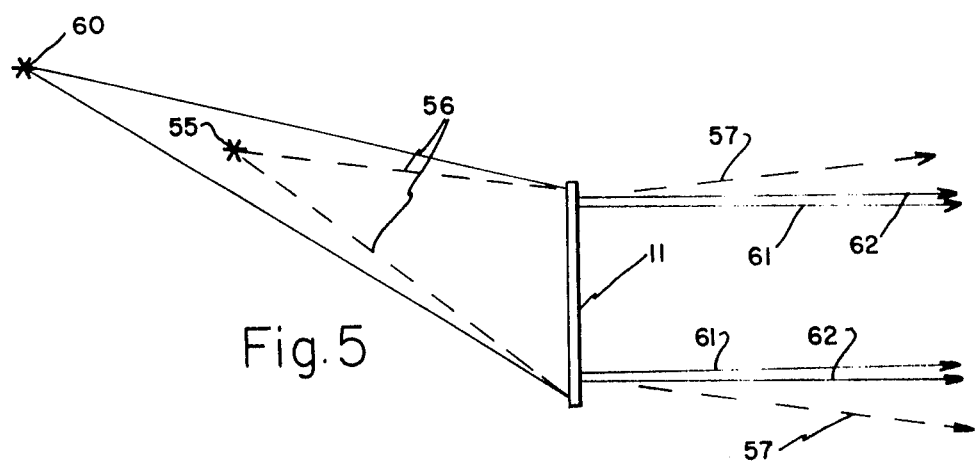
FIG. 5 is a representation similar to that of FIG. 2 illustrating how collimated beams producing the fringe pattern may be generated from the hologram of FIG. 4.
Figure 6:
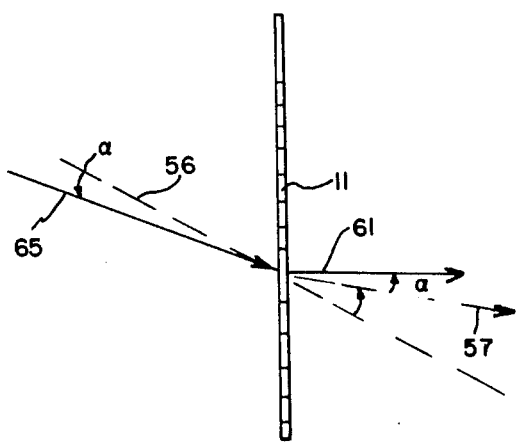
FIG. 6 is a simplified representation on enlarge scale illustrating how the reproducing light beam may be changed to obtain substantially a collimated fringe pattern.

Referring now to FIGS. 4 through 6 there is illustrated a still more simplified holographic arrangement compared to that of FIG. 1. In general, the arrangement of FIG. 4 is identical to that of FIG. 1, except that the collimating lens 20 has been omitted. As a result, the subject beams which emerge from the lens 18 are not collimated and accordingly no parallel beams will impinge on the recording material 11. However, there are still two separate beams 21 and 22 corresponding to the two separate light sources created by the mirrors 16 and 17. Otherwise the interferometric or holographic arrangement of FIG. 4 operates in the same manner as does that of FIG. 1 For certain applications it may be desirable to have a hologram with reconstructed or generated divergent beams such as illustrated in connection with FIG. 4. In general, however, it is desirable to reconstruct the fringe pattern recorded on the photosensitive material 11 in such a way that the reconstructed beams are collimated. This may be effected in the following manner.

Normally if a light source 55 for generating monochromatic light is disposed as shown in FIG. 5 it will develop a divergent light beam 56, serving as a reproducing reference beam for the recording material 11. It will be assumed that the distance of the light source 55 from the recording material 11 corresponds to the focal point of the negative or dispersing lens 28, that is, to the virtual light source of the recording reference beam. The diverging light beams of the fringe pattern which emerge from the recording material 11 are shown by the dotted lines 57.

It can now be shown that if the light source is located at the point 60, (FIG. 5), that is, further away from the recording material 11, two substantially parallel light beams 61 and 62 corresponding to the two original light sources will emerge. However, it should be understood that this is only an approximation. This system permits to save the relatively large cost of a collimating lens such as the lens 20 of FIGS. 1 or 3. This is particularly true where the lens must be large because the recording material 11 has a large area.

How this is accomplished may be explained by means of FIG. 6 which is an enlarged portion of the recording material 11. Thus the original light beam 56 from the source 55 has been shown in dotted lines. Due to the diffraction action of the hologram 11 the light beam emerges as shown at 57 in dotted lines in FIG. 6. What is wanted however, is an emerging light beam 61 which forms an angle $\alpha$ with the light beam 57. Accordingly the light beam 65 which is the reproducing reference beam should also form the angle $\alpha$ with the original beam 56. This in turn will determine the position of the light source 60. It should be noted however, that this is only an approximation and that second order aberrations may occur.

However in view of the savings in cost of a large collimating lens 20 it may be possible to tolerate the small deviations which the two fringe patterns would make in that they do not form two parallel light beams.

The hologram 11 obtained with the arrangement of FIG. 4 may also be reconstructed in another manner. The reproducing reference beam may be put in the same position as the recording reference beam. In other words, the reproducing beam has its origin at point 55. The fringes may then be reconstructed by placing a plane-convex lens in the path of the light beam 61, 62 for collimating the light. It will be realized, however, that this lens must be as large as or larger than the hologram if the entire surface of the hologram is to be used. Such large lenses are, of course, costly and therefore the arrangement of FIGS. 5 and 6 may be preferred.

In the holographic arrangement of FIG. 5 the reproducing beam differs from the recording beam. In such cases thick holograms are generally not desired. The reasons for that is that the angle of sensitivity of thick holograms serves to deflect the desired change in the angle of the reference beam.

It will now be appreciated that a hologram 11 made in any of the manners described hereinabove may be used for recreating the fringe pattern originally recorded thereon. All that needs to be done is to illuminate the hologram with substantially monochromatic light from a beam which serves as a reproducing beam. Therefore the relatively expensive interferometric or holographic arrangement shown in FIGS. 1, 3 and 4 need not be used any more after the necessary holograms have been made.

The holograms may be used in an environment which might not permit the generation of the necessary fringe patterns due to vibration, moving air and so on, which might cause the fringe pattern to move. Furthermore, in some cases the sheer size and weight of the interferometer may be too large to be accommodated in the limited space available. All that is necessary to recreate the fringe pattern is the necessary holograms, together with a substantially monochromatic light source. It should be noted that if a relatively thick hologram is used, it operates as a diffraction grating in three dimensions and hence, tends to select the particular wavelength from which it was originally recorded. Thus it may not be necessary in all cases to use a monochromatic light source for the production of the fringe patterns. On the other hand, if a white light source or a continuous light source is used there may not be sufficient light energy at the desired wavelength to produce a fringe pattern having sufficient light intensity.

There has thus been disclosed an interferometric or holographic apparatus for recording fringe patterns on a recording material. The resulting hologram may be reproduced with substantially monochromatic or in certain cases even with white light for recreating the originally recorded fringe pattern. This may be used for moire gauging, contour maps and other purposes. The holograms eliminate the problem normally inherent with the use of interferometric or holographic arrangements, say in a machine shop which is not sufficiently vibration-free and where moving air might disturb the fringe pattern.

What is claimed is:

1. An optical element for generating in space a fringe pattern when illuminated by a reproducing reference beam of substantially monochromatic light said element made by the process of recording a hologram on a recording material where said hologram is the interference pattern of a recording reference beam and two adjacent light sources, each developing an unmodulated light beam of substantially the same wavelength, whereby when said hologram is illuminated by said reproducing reference beam a fringe pattern consisting of light maxima and minima is projected, producing a member of a family of light maxima and minima each member of a family being contained substantially in a given surface.

2. An optical element as defined in claim 1 wherein said recording material is relatively thick compared to the spacing between fringes constituting the hologram, whereby a three-dimensional hologram is provided in said recording material.

3. An optical element as defined in claim 1 wherein a plurality of discrete and different fringe patterns is recorded on said recording material, each particular fringe pattern being reproducible by a reproducing reference beam impinging at a different angle upon said recording material.

4. An optical element as defined in claim 1 wherein a plurality of discrete and different fringe patterns is recorded on said recording material, each particular fringe pattern being reproducible by a reproducing reference beam having a wave length different from that of the other reference beams.

5. An optical element as defined in claim 1 wherein each of the two unmodulated light beams from said two adjacent light sources is a diverging light beam.

6. An optical element as defined in claim 5 wherein said fringe patterns are capable of being reproduced by a reproducing reference beam having an origin farther away from said recording material than that of the recording reference beam recording the hologram, thereby to provide substantially collimated output light beams.

7. The method of preparing an optical element for generating a fringe pattern when illuminated by substantially monochromatic light, said fringe pattern consisting of light maxima and minima, each member of a family of light maxima being contained substantially in a given surface, said method consisting of the steps of:
 recording on a recording material, a reference beam and a first unmodulated subject beam from a first virtual light source, each of said beams having substantially the same wave length, and
 subsequently recording a second unmodulated subject beam of substantially the same wavelength corresponding to a second virtual light source having a position adjacent to that of the first light source, whereby a double-exposure hologram is obtained.

8. The method of recording an optical element and subsequently reproducing it, said optical element generating a fringe pattern when illuminated by substantially monochromatic light, said fringe pattern consisting of light maxima and minima, each set of light maxima being contained substantially in a given surface, said method including the steps of:
 recording on a recording material a reference beam and a pair of unmodulated subject beams, each of said beams having substantially the same wave length and said two subject beams being generated by two adjacent light sources, said beams diverging toward the recording material, said reference beam having a focal point, and subsequently reproducing the recorded fringe pattern by means of a substantially parallel pair of light beams by illuminating the recording material by a virtual light source having substantially the same wavelength as that of said reference beam, said light source being at a location different from the focal point of said reference beam so that the resulting fringe pattern consists of two substantially parallel light beams corresponding to the two recording light sources.

* * * * *